(12) United States Patent
Coward et al.

(10) Patent No.: US 8,174,705 B1
(45) Date of Patent: May 8, 2012

(54) TILTING MIRROR CONTROLLED USING NULL-BASED INTERFEROMETRIC SENSING

(75) Inventors: James F. Coward, Portland, OR (US);
Ting K. Yee, Foster City, CA (US);
William C. Dickson, Granville, OH (US)

(73) Assignee: SA Photonics, Inc., San Francisco, CA (US)

( * ) Notice: Subject to any disclaimer, the term of this patent is extended or adjusted under 35 U.S.C. 154(b) by 304 days.

(21) Appl. No.: 12/707,650

(22) Filed: Feb. 17, 2010

(51) Int. Cl.
*G01B 11/02* (2006.01)
*G01N 21/00* (2006.01)
(52) U.S. Cl. .......................................... 356/510; 356/73
(58) Field of Classification Search ................ 356/73, 356/496, 506, 508, 510, 452
See application file for complete search history.

(56) References Cited

U.S. PATENT DOCUMENTS

| | | | | |
|---|---|---|---|---|
| 4,053,231 A | * | 10/1977 | Fletcher et al. | 356/510 |
| 4,711,573 A | * | 12/1987 | Wijntjes et al. | 356/452 |
| 5,825,491 A | * | 10/1998 | Cutler | 356/451 |
| 7,764,385 B1 | * | 7/2010 | Dey | 356/518 |

* cited by examiner

*Primary Examiner* — Michael A Lyons
(74) *Attorney, Agent, or Firm* — Fenwick & West LLP (57) ABSTRACT

A mirror drive mechanism for a tilting mirror is controlled using feedback from one or more interferometric angular sensors. The wavelength of an optical beam is varied as it is fed into an interferometric angular sensor. The wavelength at which the resulting interference pattern is measured to be at a minimum intensity is determined. This wavelength is used to determine a distance quantity representative of the angular position of the mirror.

17 Claims, 8 Drawing Sheets

TILTING MIRROR CONTROLLED USING NULL-BASED INTERFEROMETRIC SENSING

CROSS-REFERENCE TO RELATED APPLICATION

This application relates to U.S. patent application Ser. No. 12/707,642, entitled "Null-based Interferometric Distance Sensing" filed Feb. 17, 2010. The subject matter of the foregoing is incorporated herein by reference in its entirety.

BACKGROUND

1. Field of Art

This invention generally relates to the field of mirror control systems, and specifically relates to high resolution angle sensing for minor control systems.

2. Description of the Related Art

In many active optics applications, minor control systems are used to control the orientation and position of a moveable mirror. In such systems, a minor drive mechanism is used to adjust the minor, and one or more position sensors may be used to precisely measure the resulting orientation and/or position of the mirror.

One type of position sensor used in some minor control systems is a Fabry-Pérot interferometer. In a Fabry-Pérot interferometer, a photocurrent, $I_p$, is measured from an interference wave generated from the combination of beams from two arms of the interferometer, and the photocurrent is used to determine a distance of interest. However, this measuring approach has several disadvantages. Measuring the distance of interest accurately relies on the exact response shape of the Fabry-Pérot photocurrent, but this shape depends strongly on the physical parameters of the Fabry-Pérot interferometer and the optical components around it. These parameters may vary during operation. Furthermore, due to laser intensity noise, the measurement sensitivity reduces when the detected photocurrent, $I_p$, is near its peak.

For applications requiring mirror control systems having high speed and accuracy, there is a need for improved systems and methods for quickly steering a mirror and obtaining precise measurement of the mirror's resulting angular position.

SUMMARY

The present invention overcomes the limitations of the prior art by controlling a minor drive mechanism for a tilting minor using feedback from one or more interferometric angular sensors. The wavelength of an optical beam is varied as it is fed into an interferometric angular sensor. The wavelength at which the resulting interference pattern is measured to be at a minimum intensity is determined. This wavelength is used to determine a distance quantity representative of the angle of the mirror.

In one aspect, a mirror control system includes a minor angle sensor subsystem, a control algorithm processor and a minor driver. The mirror angle sensor subsystem optically measures the angle of the minor. The control algorithm processor instructs the mirror driver to adjust the angle of the mirror. The change in the angle of the minor is sensed by the minor angle sensor subsystem and can be used as feedback to the control algorithm processor.

In one embodiment, the minor angle sensor subsystem includes a coarse sensor and a fine sensor. The coarse sensor optically detects the angle of the mirror using a position sensitive detector. The coarse sensor is configured to detect the angle of the minor over the entire angular range of the mirror with an angular resolution that corresponds to a resolution of a change in position of a reflecting surface on the tilting mirror of better than one fourth of the wavelength of the optical source of the fine sensor. The fine sensor optically detects the angle of the mirror using an interferometric technique. An optical source generates an optical beam characterized by a wavelength that is adjustable by a wavelength controller. An optical path couples the optical beam from the optical source to a collimating device, which couples the optical beam to a partially reflecting surface. The partially reflecting surface forms an optical cavity of a Fabry-Pérot interferometer with a retroreflector mounted on the tilting minor. Waves reflected back into the optical path from the partially reflecting surface and the retroreflector create an interference wave. The interference is a function of the optical path length between the partially reflecting surface and the retroreflector. An optical detector detects an intensity of the interference wave. Based on the detected intensities and corresponding wavelengths, a processing device determines a null wavelength at which the intensity of the interference wave is a minimum. Based on the null wavelength, the distance quantity that is a function of the optical path length is determined, and accordingly, the angular position of the minor is also determined.

In other embodiments, a plurality of coarse and/or fine sensors may be used to improve the measurement results of the mirror angle sensor subsystem. For example, a pair of sensors may be used on opposite sides of a pivot point of a tilting minor to obtain two measurements of the same angle of the minor. Alternatively or additionally, optical elements of a plurality of sensors may be shared by overlaying portions of the optical paths traveled by the optical beams received by the plurality of sensors. The sharing of optical elements between different sensors may save space, weight, and cost in some applications.

In another aspect, the minor driver of the minor control system comprises a voice coil drive mechanism that is accelerated with a large current for a short period, then decelerated with a large current for short period, and finally a third current is applied briefly to mitigate any residual electromagnetic field created in the voice coils so that a static state can be reached. Thus, the mirror can be moved through a large angle at high speed with minimal overshoot.

Other aspects of the invention include systems and applications for the devices described above, and methods corresponding to all of the foregoing.

BRIEF DESCRIPTION OF DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
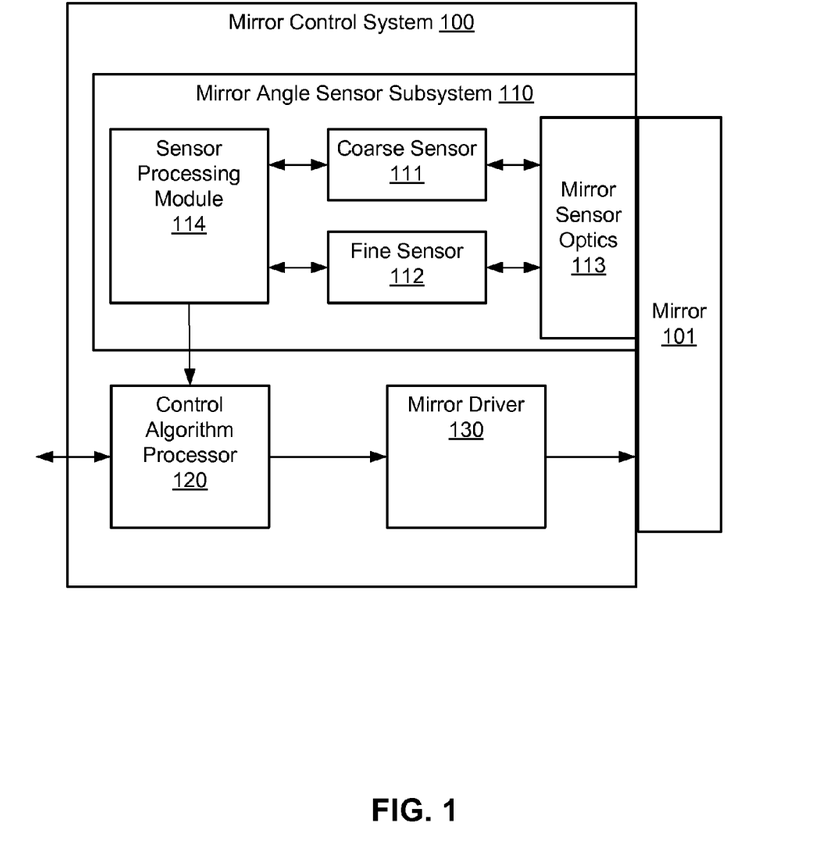
FIG. 1 is a high-level block diagram of a minor control system used to control the angle of a minor, in accordance with an embodiment.

FIG. 1 is a high-level block diagram of a minor control system 100 used to control the angle of a moveable mirror 101, in accordance with an embodiment. In this example, the minor control system includes a mirror angle sensor subsystem 110, a control algorithm processor 120 and a mirror driver 130.

The minor angle sensor subsystem 110 senses the angle of the minor 101 by using reflections from one or more reflective surfaces of the minor sensor optics 113. The minor sensor optics 113 may comprise a reflective surface mounted to the mirror 101 or may comprise a reflective surface of the minor 101 in various embodiments.

In addition to the mirror sensor optics 113, the minor angle sensor subsystem 110 includes a coarse sensor 111, a fine sensor 112, and a sensor processing module 114. The coarse sensor 111 generates a signal representing the angle of the mirror 101 to within an accuracy of, for example, 10 microradians, over the entire range of angular movement of the minor 101. In one implementation, the coarse sensor 111 has sufficient resolution to distinguish a change in position of the mirror sensor optics 113 as the mirror tilts corresponding to one fourth of a wavelength of an optical source used for the fine sensor 112. The position resolution is related to the angular resolution through the position of the minor sensor optics 113 on the mirror with respect to a pivot of the mirror. The fine sensor 112 generates a signal representing the angle of the minor 101 with an accuracy of better than 100 nano-radians in some implementations, over a much smaller range than the coarse sensor 111. The sensor processing module 114 receives the signals generated from both the coarse sensor 111 and the fine sensor 112 and processes them to determine the angle of the minor 101. Examples of sensor processing module 114 include, but are not limited to digital signal processing modules and field-programmable gate array module. The coarse sensor 111 and the fine sensor 112 are described in further detail with reference to FIGS. 2 and 3 below.

The control algorithm processor 120 receives instructions for altering the angle of the mirror 101, for example from a controlling entity such as an operator or a computer guidance system. The control algorithm processor 120 processes the instructions according to a control algorithm to determine the corresponding inputs to deliver to the mirror driver 130. The mirror driver 130 receives the inputs from the control algorithm processor 120 and drives a minor adjustment mechanism to adjust the minor 101 accordingly. As a result, the angle of the mirror 101 changes.

In one embodiment, the components illustrated in FIG. 1 can be used to create a closed feedback loop capable of high-speed updates. In closed loop operation, the control algorithm processor 120 directs the mirror driver 130 to adjust the angle of the minor 101. The resulting change in the angle of the mirror 101 is sensed by the minor angle sensor subsystem 110, and is used as feedback to the control algorithm processor 120. In some embodiments, the control algorithm processor 120 may report the revised angle of the mirror 101 to a controlling entity.

Figure 2:
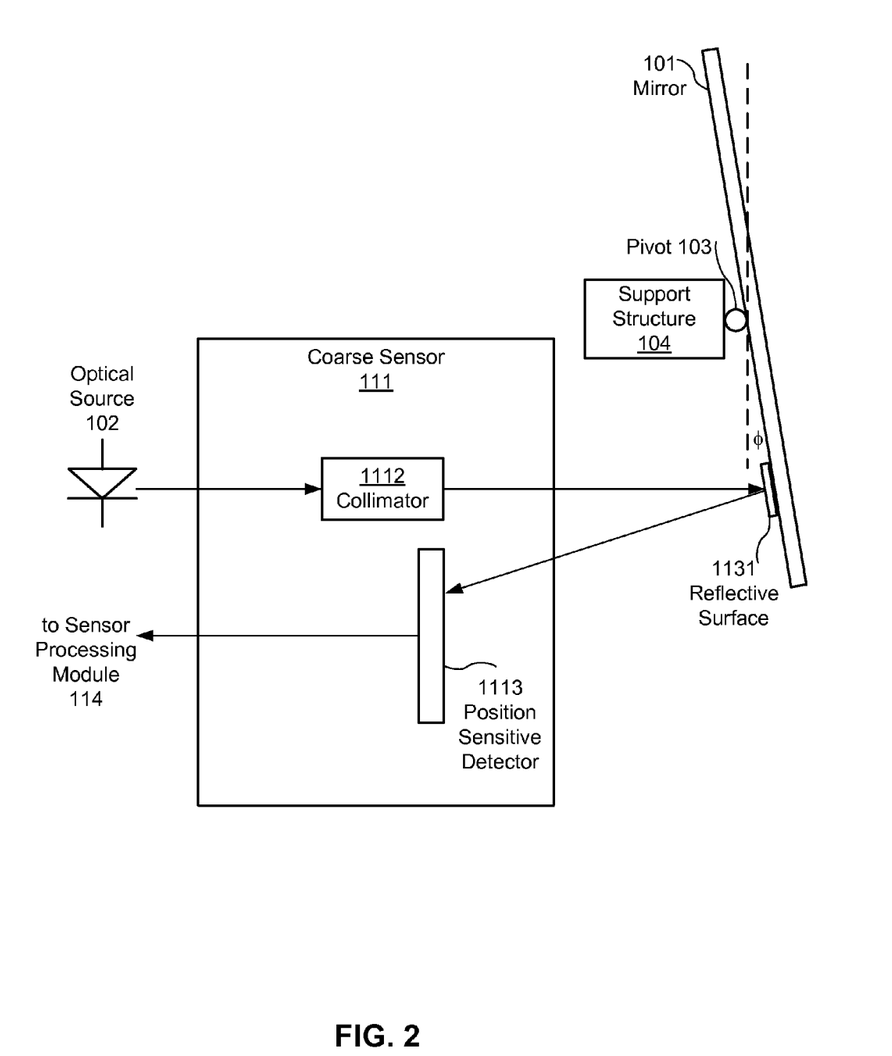
FIG. 2 is an illustration of an example coarse angular sensor of the mirror control system, in accordance with an embodiment.

FIG. 2 is an illustration of an example coarse angular sensor 111 of the minor control system 100, in accordance with an embodiment. Also shown in FIG. 2 is the mirror 101 connected to a support structure 104 by a pivot point 103 around which the minor 101 rotates. A reflective surface 1131 is on the minor 101, either by being mounted on the mirror 101 or by being a surface of the mirror 101. In this example, the reflective surface 1131 is an example of the mirror sensor optics 113 described above with reference to FIG. 1.

The coarse angular sensor 111 includes a collimator 1112 and a position sensitive detector (PSD) 1113. An optical beam from optical source 102 passes through the collimator 1112, which may be a micro collimating lens or a GRIN lens, and is incident on the reflective surface 1131. The reflective surface 1131 reflects the optical beam to the PSD 1113. In one embodiment, the PSD 1113 may sense position in either one or two dimensions, and may be sized to have a detector area of 10 mm by 10 mm or 20 mm by 20 mm for example, but a PSD 1113 of other sizes can also be used. The PSD 1113 outputs a signal to the sensor processing module 114 representative of the position on the detector at which the optical beam intersects. The position on the PSD 1113 is correlated to the angle of the minor 101. As the angle of the mirror 101 changes, the angle at which the optical beam is incident on the reflective surface 1131 also changes. As a result, the optical beam is reflected at a different angle and intersects the PSD 1113 at a different position. One advantage of using a PSD in a coarse angular sensor 111 as compared to using a fringe counting device is that unlike a fringe counting device, the coarse angular sensor 111 is not susceptible to losing track of the angle during sudden angle changes, which would lead to inaccurate results. Another advantage is that the PSD provides an absolute reference for the relative measurement of the fine sensor 112.

It will be appreciated that the resolution of the coarse angular sensor 111 is dependent on the distance from the pivot point 103 at which the optical beam is incident on and reflected from the reflective surface 1131. As distance from the pivot point 103 increases, a given small change in mirror angle results in increasingly large changes in position of the reflected optical beam on the PSD 1113. Thus, in one embodiment, the optical beam is incident on and reflected from a reflective surface 1131 positioned near an edge of the mirror 101 furthest from the pivot point 103. It will also be appreciated that FIG. 2 is merely an example arrangement of the minor 101, pivot 103, support structure 104, and reflective surface 1131. In some embodiments the pivot point 103 is not located in the center of the mirror 101 and may be located elsewhere, for example, at a mirror's edge. Additionally or alternatively, the pivot point 103 does not necessarily correspond to a point of attachment of the minor the support structure. For example, a plurality of actuators that also mechanically support the minor may be positioned at corners of a mirror, but the pivot 103 may occur at a central location.

Figure 3:
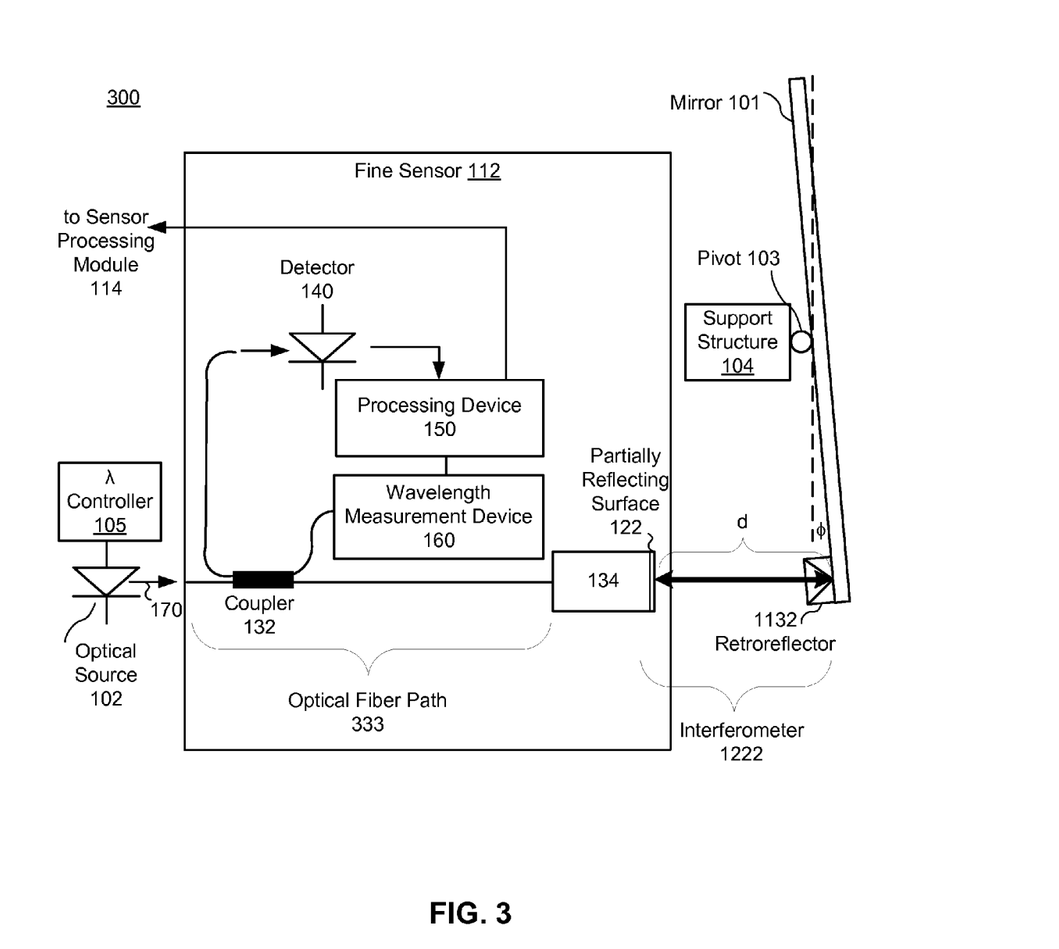
FIG. 3 is an illustration of an example fine angular sensor that uses interferometric distance sensing, in accordance with an embodiment.

FIG. 3 is an illustration of components of a tilting minor control device 300 that includes a fine angular sensor 112 that uses null-based interferometric distance sensing, in accordance with an embodiment. The components of the fine angular sensor 112 as shown in the example of FIG. 3 will be described in the context of the tilting minor control device 300.

The tilting minor control device 300 includes an optical source 102 coupled to a Fabry-Pérot interferometer 1222 via an optical fiber path 333. In this example, the cavity for the Fabry-Pérot interferometer 1222 is formed by a partially reflecting fixed surface 122 and a retroreflector 1132 located on the tilting mirror 101, which are separated by some physical distance d. In one implementation, the retroreflector 1132 comprises a corner cube that functions as an optical element of the mirror sensor optics 113 shown in FIG. 1. The cavity is a free space cavity of length d, and the free space Fabry-Pérot interferometer 1222 is coupled to the optical fiber path 333 by a collimating device 134, for example a collimating lens or GRIN lens. In some embodiments, the partially reflecting surface 122 may be one surface of the collimating device 134. In other embodiments, the partially reflecting surface 122 may be located in free space between the collimating device 134 and the retroreflector 1132. In other embodiments, it may be located before the collimating device 134, for example implemented along the optical fiber path 333. In one implementation, the optical components of the fine angular sensor 112 described above are configured so that the beam incident on a corner cube used as the retroreflector 1132 overfills it so that the reflection of the incident beam from the corner cube is of a relatively constant intensity regardless of the changes in position of the corner cube due to the change in mirror angle. In some implementations, overfilling ensures that all reflected beams are able to interfere with each other despite beam displacement caused by the movement of the retroreflector 1132 as the mirror 101 tilts.

The tilting minor control device 300 also includes an optical detector 140 coupled to a processing device 150 as part of the fine sensor 112. The optical detector 140 detects an intensity of an "interference" wave produced by the Fabry-Pérot interferometer 1222. The "interference" wave is the net effect of the interference of the waves coming from the Fabry-Pérot interferometer 1222. This interference is a function of the cavity length d. The processing device 150 determines the distance d based on the detected intensity. However, unlike conventional interferometric devices, the processing device 150 determines d based on determining the wavelength at which the interference wave has minimum intensity. For convenience, this wavelength will be referred to as the null wavelength.

The optical source 102 generates an optical beam 170 that is variable in wavelength. In this example, the optical source 102 is a tunable laser diode operating in the 1.5 μm wavelength region, but alternatively, optical sources 102 operating in other wavelength ranges may be used. A wavelength controller 105 controls the wavelength of the optical beam 170. In this implementation, a separate wavelength measurement device 160 measures the wavelength of the optical beam 170. In this design, the optical source 102, Fabry-Pérot interferometer 1222, optical detector 140 and wavelength measurement device 160 are optically coupled to each other by 2×2 optical coupler 132 and optical fibers connected to the ports of the optical coupler.

The wavelength measurement device 160 sends its wavelength measurements to the processing device 150. Thus, the processing device 150 receives intensity (I) measurements from detector 140 and corresponding wavelength (λ) measurements from wavelength measurement device 160. As the wavelength is varied by wavelength controller 105, the processing device 150 can construct a curve of I vs λ that contains maxima and minima. The processing device 150 then determines a null wavelength where I is a minimum. Based on the null wavelength, the processing device 150 can then determine d, which is related to the angle of the minor 101 through the geometry of the rotation of minor 101 around the pivot point 103. Alternatively, based on the null wavelength, the processing device 150 can then determine a relative distance (e.g., the change in physical distance Δd relative to some reference position), which is related to a relative change in the angle of the mirror 101.

The fine sensor 112 of the tilting minor control device 300 functions as follows. The optical source 102 produces an optical beam 170, with the wavelength controller 105 setting the wavelength. The optical beam 170 is launched into optical fiber path 333. A portion of the optical beam 170 is tapped by coupler 132 to wavelength measurement device 160, which determines the wavelength. The wavelength measurement is sent to processing device 150. The rest of the optical beam 170 is transmitted via optical fiber path 333 and collimating device 134 to the Fabry-Pérot interferometer 1222.

When the optical beam 170 is incident on partially reflecting surface 122, it is split into a reflected wave and a transmitted wave. The reflected wave is reflected back to the optical fiber path 333. The transmitted wave propagates forward and is reflected by the retroreflector 1132 back to the partially reflecting surface 122, which then splits it again into a transmitted wave and a reflected wave. This time, the transmitted wave is coupled back to the optical fiber path 333 and the reflected wave is directed back to the retroreflector 1132. In this way, the partially reflecting surface 122 creates a number of waves that propagate back along the optical fiber path 333. These waves interfere with each other to create an interference wave. Whether the waves interfere constructively or destructively depends upon their phase differences. The phase difference is a function of the wavelength λ and the distance d.

As the interference wave propagates back along the optical fiber path 333, coupler 132 directs a portion of the interference wave to detector 140. The detector 140 measures the intensity of the interference wave and sends this to the processing device 150. The processing device 150 determines the null wavelength based on the intensity measurements from detector 140 and the wavelength measurements from device 160. The distance d is then determined from the null wavelength, and the angle φ of the mirror 101 is determined from the geometric relationship between the distance from the pivot point 103 at which the retroreflector 1132 is positioned and the distance d.

Figure 4:
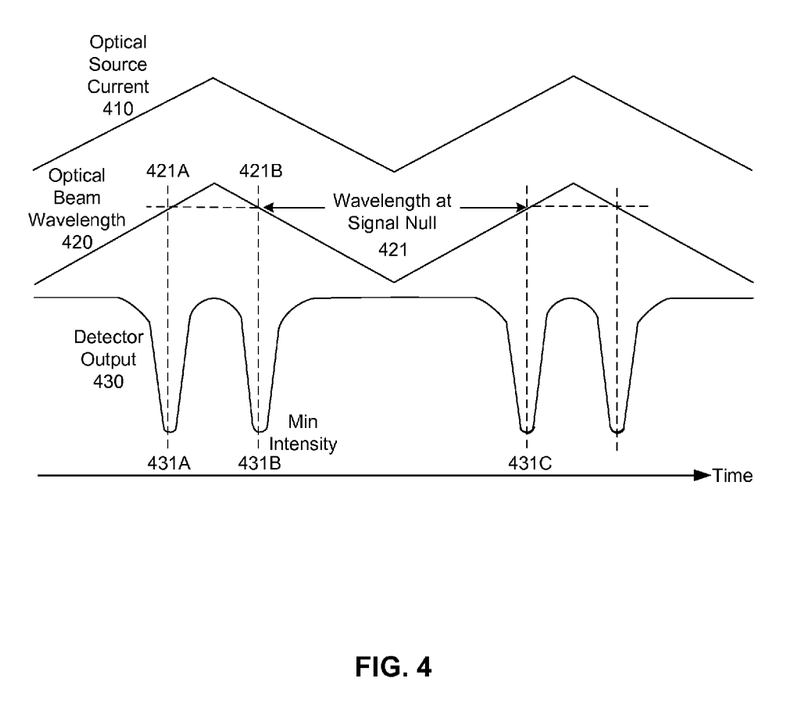
FIG. 4 is a time plot that illustrates using interferometric distance sensing, in accordance with an embodiment.

FIG. 4 illustrates one approach for finding the null wavelength. In this approach, the minimum intensity of the interference wave is found by varying the wavelength of optical beam 170 in time. In this particular example, the optical source 102 is a tunable laser diode. The wavelength controller 105 varies the drive current to the laser diode, which adjusts the output wavelength of the laser diode. Curve 410 shows the drive current as a function of time, and curve 420 shows the corresponding wavelength λ of the optical beam 170. The detected intensity is shown by curve 430.

The detector 140 makes intensity measurements 430 of the interference wave at different points in time while the wavelength measurement device 160 makes corresponding wavelength measurements 420 of the optical beam 170. The processing device 150 combines the intensity measurements 430 with the wavelength measurements 420 to determine the null wavelength 421. The distance quantity can then be determined using the null wavelength 421, based on standard optics expressions relating the null wavelength 421 and the distance quantity.

Different approaches can be used to determine the null wavelength. In the example of FIG. 4, the wavelength of the optical beam 170 is scanned linearly in time. Other scan patterns can also be used. For example, the wavelength may be varied sinusoidally in time or according to other predefined wavelength scan patterns. In another approach, the wavelength is varied, but not necessarily according to a predefined pattern. The scan pattern can vary as long as intensity measurements and wavelength measurements can be combined to determine the null wavelength. In a synchronous approach, an intensity sample and a wavelength sample are taken at the same time so that they correspond to each other. This yields a set of (I,λ) samples, which can be used to determine the null wavelength. In a non-synchronous approach, intensity samples are taken non-synchronously with wavelength samples. However, if both samples are referenced to the same time reference, they can be interpolated or otherwise processed to determine a graph of I vs λ, or at least to determine the null wavelength. In one implementation, the wavelength is scanned over an approximately 0.1 nm range at a scan rate of approximately 100 kHz. The scan range preferably is wide enough to allow detection of the null wavelength. However, the scan range and rate can vary depending on the application.

Figure 5A:
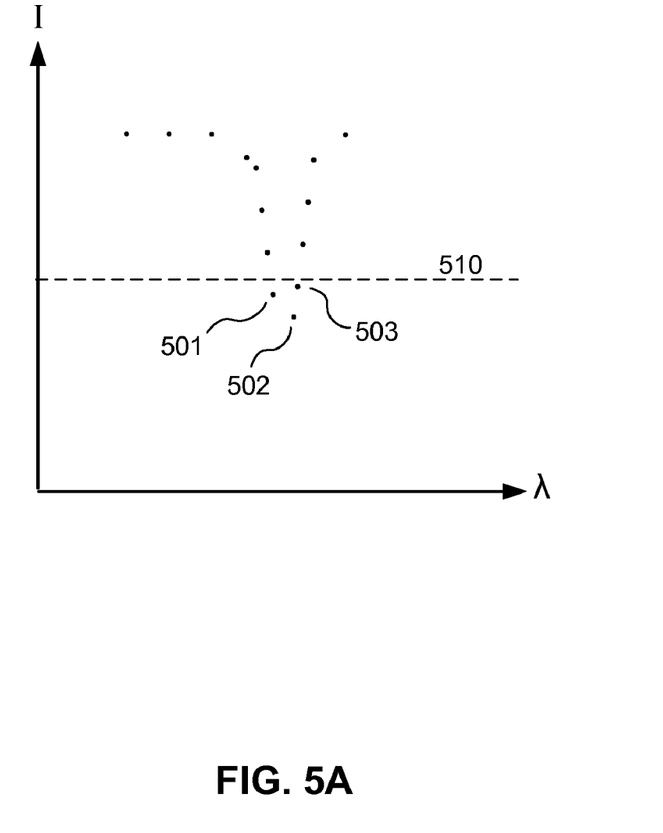
FIGS. 5A and 5B are graphs illustrating determination of the null wavelength based on interpolation of $(I,\lambda)$ samples.
Figure 5B:
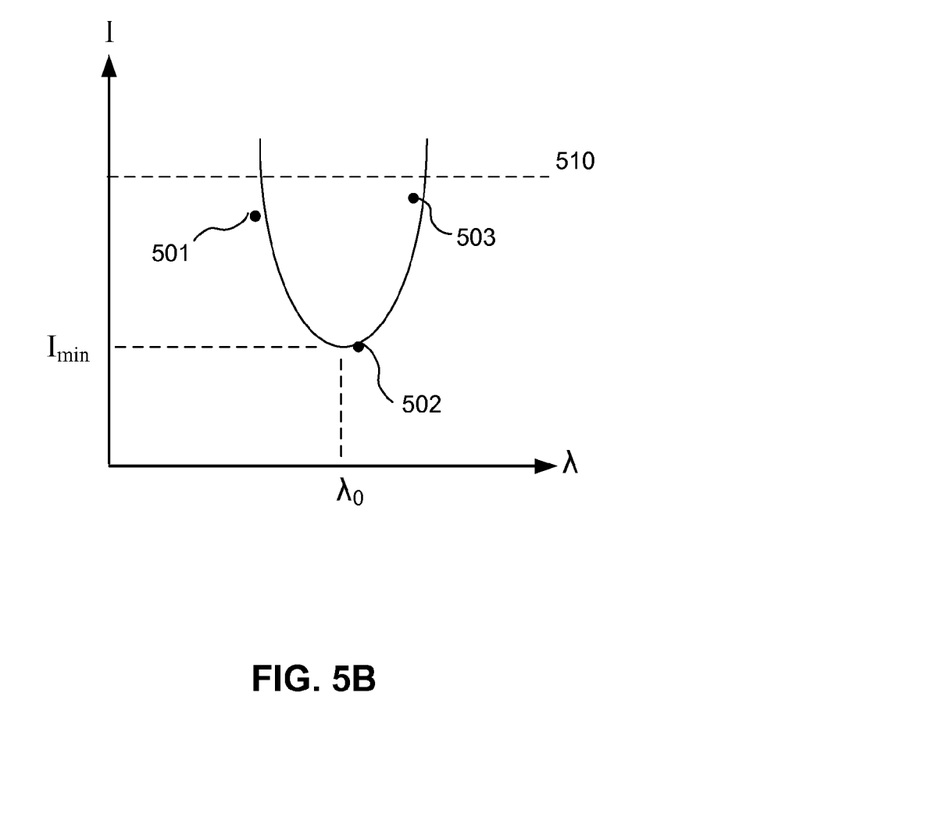

FIGS. 5A and 5B are graphs illustrating determination of the null wavelength based on interpolation of coordinated (I,λ) samples. In this example, intensity measurements 430 and wavelength measurements 420 are sampled synchronously. The two data sets are combined by correlating the timestamps to generate a single data set of (I,λ) pairs, as plotted in FIG. 5A. In one approach, this data is curve fit to the expected equation to estimate the null wavelength. In another approach, since the goal is to determine the null wavelength, a curve fit may be performed based only on (I,λ) pairs that are below a certain threshold marked as line 510 in FIG. 5A, or for a set of the lowest detected intensities. In FIG. 5A, points 501, 502 and 503 are the set of three lowest detected intensities. These are interpolated based on the expected form of the function, as shown in FIG. 5B, to estimate the null wavelength $\lambda_0$.

The processing device 150 in FIG. 3 may save power or processing time by operating on only selected points (e.g., 501, 502, 503) rather than all points. In this example, the processing device 150 operates only on the three lowest intensity points. In another approach, the processing device 150 might operate only on points below a certain threshold, for example 510 shown in FIG. 5A. For example, if $I_{max}$ is the maximum intensity, the threshold 510 could be set in the range of 10-25% below $I_{max}$. Thus, the processing device 150 may only send output to the sensor processing module 114 when it is operating on points below a certain threshold. In some implementations, it is noted that the processing device 150 of the fine sensor 112 and the sensor processing module 114 may be combined into a single device that performs both functions.

Figure 6:
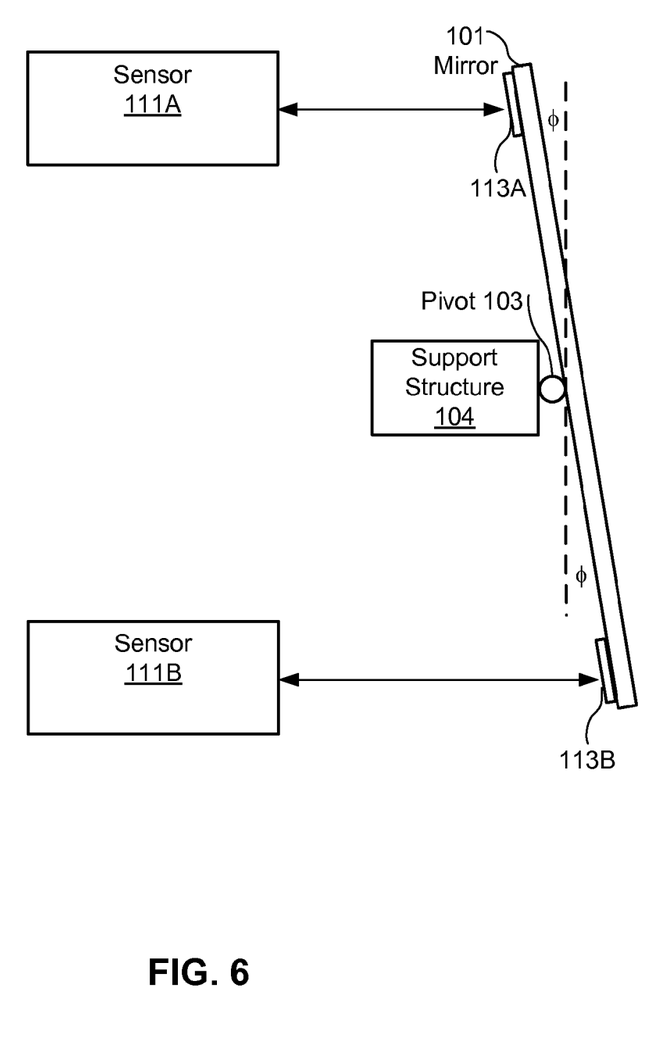
FIG. 6 is a high level block diagram of a device including a plurality of angular sensors, in accordance with an embodiment.

FIG. 6 is a high level block diagram of a device including an alternative arrangement of a plurality of sensors of mirror angle sensor subsystem 110 shown in FIG. 1 for sensing the angle φ of a mirror 101 that tilts around pivot point 103 of a support structure 104. In this example, two coarse angular sensors 111A, 111B, are shown, but any combination of course sensors 111 and fine sensors 112 described above with reference to FIGS. 1-3 can be used. As shown in FIG. 6, both sensors 111A, 111B are directed to detecting the same angle φ of a minor 101, in this case relative to vertical, although they are positioned to sense an optical beam reflected from mirror sensor optics 113A, 113B on opposite ends of the mirror 101. Although one sensor will measure a positive angle and the other sensor will measure a negative angle in this arrangement, the absolute value of the angle relative to vertical is the same on both ends of the mirror 101. It may be advantageous to use multiple sensors having different sensitivities, different operating ranges, and/or different noise characteristics to improve the measurement of the angle φ of the minor 101. In one embodiment, a plurality of fine sensors 112 can be used to differentiate piston movement of a minor from tip-tilt angular movement. The measurements of the angle of the minor from a plurality of sensors can be compared to remove an effect of pistoning of the minor from measurements of the angle of the mirror. Thus, piston movement can be prevented from corrupting angle measurement. In other arrangements, where multiple sensors are used, optical components may be shared between sensors by overlaying portions of the optical paths traveled by the beams ultimately received by the sensors. The sharing of optical elements between different sensors may save space in the device, reduce the weight of the mirror control system, and lower the cost of manufacturing the mirror control system 100.

Figure 7:
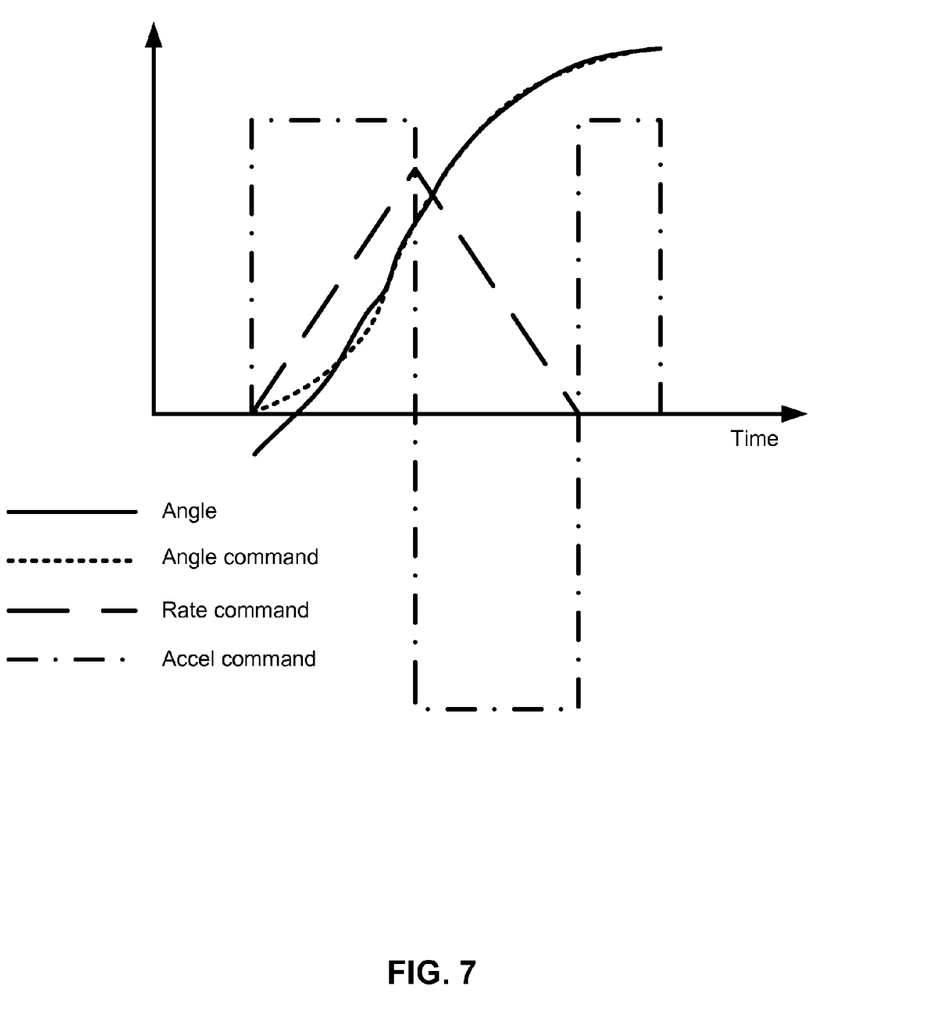
FIG. 7 illustrates the trajectory for minimum-time large-angle adjustments using the mirror control system of FIG. 1, in accordance with an embodiment.

FIG. 7 illustrates an example trajectory for minimum-time large-angle adjustments using the minor control system 100 of FIG. 1, in accordance with an embodiment. In one implementation, a fast steering minor 101 can be moved through a large angle and settled to better than 5 microradians in less than 1 ms. In one approach, the mirror driver 130 comprises a voice coil drive mechanism for the mirror 101; however, piezoelectric, electrostatic, or other drivers may be used alternatively. The minor 101 is accelerated with a large current for a short period, then decelerated with a large current for a short period, and then finally a third current is applied briefly to mitigate any residual electromagnetic field created in the minor's coils so that a static state can be reached. For example, for a 1 inch minor, a current of nearly 10 A can be applied for 0.4 ms to accelerate the minor, a current of nearly 10 A can be applied for nearly 0.4 ms can be applied to decelerate the mirror, and finally a current of nearly 10 A can be applied for 0.1 ms to drive the residual coil current to zero by the end of the trajectory. During the course of the minor's transition from the starting angle to the new angle, the angular position of the mirror is determined at rate of 100 kHz by the mirror angle sensor subsystem 110 and used as feedback to the control algorithm processor 120 to make fine adjustments to the acceleration and deceleration current to ensure that the minor 101 is on the proper trajectory. In one implementation, this results in high speed transitions with minimal overshoot.

The objective of the three-stage sequence of current commands shown in FIG. 7 is to move the mirror from one static angle to another static angle with no residual current. The sequence of piecewise constant, or Zero-Order-Hold (ZOH), current commands of varying duration required to accomplish this objective can be derived from a manipulation of the linear time-invariant equations describing the minor system. The discrete-time state-space equations for the minor system can be written in the form well known to those skilled in the art:

$$X_{k+1} = F_k X_k + G_k u_k. \quad (1)$$

In Eq. 1, X is the N×1 state vector of the minor system, which includes the mirror angle, the drive signal, and any necessary derivatives of the angle and drive signal. The quantity u is the scalar commanded value of the drive signal, the quantity F is the N×N discrete-time state transition matrix for the system, and the quantity G is the N×1 discrete-time influence vector. The index "k" is used to denote the sequence number indicating the time period $T_k$ over which the ZOH current command $u_k$ is applied. The state $X_k$ is the value of the state X at the start of the k-th time period $T_k$. To allow for variable-duration time periods for the sequence of current commands, the quantities F and G are subscripted with the sequence index k to emphasize that their values are sequence-dependent.

Well known to those skilled in the art, a sequence of N values of $u_k$ applied for the associated time periods $T_k$ is required to move the state X from an arbitrary initial value $X_{start}$ to an arbitrary final value $X_{end}$. The N values of $u_k$ can be determined by symbolically propagating the initial state $X_{start}$ through Eq 1. The symbolic propagation results in the state propagation equation given by:

$$X_{end} = PU + QX_{start} \quad (2)$$

In Eq. 2, the N×N matrix P is given by:

$$P = [P_0 P_1 \ldots P_{N-1}], \quad (3)$$

where the N×1 vectors $P_k$ are given by the product:

$$P_k = F_{N-1} F_{N-2} \ldots F_{k+1} G_k \ (k=0,1,\ldots,N-1). \quad (4)$$

In Eq. 2, the matrix Q is given by the product:

$$Q = F_{N-1} F_{N-2} \ldots F_0. \quad (5)$$

In Eq. 2, the N×1 vector U is the concatenation of the N values of $u_k$ (k=0, 1, ..., N−1):

$$U = [u_0 u_1 \ldots u_{N-1}]^T. \quad (6)$$

Eq. 2 can be solved for the vector of current commands U:

$$U = P^{-1}(X_{end} - QX_{start}). \quad (7)$$

The N values of commanded currents $u_k$, as defined by Eq. 6 and expressed in Eq. 7, are then applied sequentially for the durations $T_k$ to move the state X from $X_{start}$ to $X_{end}$ as desired.

Although the derivation of Eq. 1-7 used a commanded current as the driving signal u, the approach is not limited to currents. Also, while a scalar (single-input) drive signal u was used, any number of drive signals could be combined into an equivalent single drive signal u with a corresponding influence vector G. Once solving for the sequence of N values of the scalar input $u_k$, an equivalent set of multi-input drive signals can be computed using system-specific equations.

The specific construction of an appropriate minor control system will depend on the requirements of the application. Although the detailed description contains many specifics, these should not be construed as limiting the scope of the invention but merely as illustrating different examples and aspects of the invention. It should be appreciated that the scope of the invention includes other embodiments not discussed in detail above. For example, different types of optical sources can be used. One example is a tunable laser. There are numerous types of tunable lasers such as free electron lasers, carbon dioxide lasers, dye lasers, and semiconductor diode lasers. Another example is a fixed wavelength laser followed by an external wavelength shifter.

Non-monochromatic sources may also be used. In that case, the optical beam 170 may include multiple wavelengths at any instant in time. In one approach, an adjustable wavelength filter selects the wavelength. The wavelength filter could be positioned before the Fabry-Pérot interferometer so that only a single wavelength enters the interferometer. Alternately, it could be positioned after the interferometer (e.g., before the detector) so that the wavelength is selected afterwards.

In yet another approach, the wavelength controller 105 is not used. Rather, the optical source is a white light or other multi-wavelength source. The optical beam 170 includes many wavelengths that propagate simultaneously through the interferometer and are passed to the detector 140. The detector 140 (or detector array) separates the wavelengths to determine the intensity of the interference wave for each wavelength that is present in the optical beam 170. This can be achieved by using a grating or a set of wavelength filters, for example.

In addition, terms such as "optical" and "light" are not intended to be limited to the visible spectrum. It is intended to also include the ultraviolet and infrared portions of the spectrum, for example. As another alternative, an optical fiber path also is not required. Free space propagation can be used, or a combination of fibers, other waveguides and free space. In another variation, the optical cavity may have a differently shaped geometry than the geometry shown in FIG. 3.

The wavelength measurement device 160 is also optional. It may be possible to determine the wavelength of the optical beam 170 in other ways, for example by the amount of current supplied to the optical source 102. When a wavelength measurement device is used, various designs can be used that are commercially available.

Some embodiments may be described using the expression "coupled" or "connected." It should be understood that these terms are not intended as synonyms for each other. The term "connected" indicates that the connected elements are in direct physical or electrical contact with each other. The term "coupled" includes the case where the coupled elements are in direct physical or electrical contact but it also includes the case where the coupled elements are not in direct contact with each other, but still co-operate or interact with each other. In particular, there may be intervening elements.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mirror control system for controlling an angle of a mirror, the system comprising:
   a control algorithm processor for processing instructions for altering an angle of the minor;
   a mirror driver coupled to the control algorithm processor to adjust the angle of the minor according to the instructions processed by the control algorithm processor; and
   a mirror angle sensor subsystem comprising an interferometric angular sensor configured to determine an angle of the mirror after adjustment based on a wavelength at which an intensity of an interference wave is a minimum, the minor angle sensor subsystem coupled to the control algorithm processor to provide the angle of the minor as feedback to the control algorithm processor.

2. The minor control system of claim 1, wherein the minor angle sensor subsystem further comprises a coarse angular sensor and wherein the interferometric angular sensor is a fine sensor.

3. The minor control system of claim 2, wherein the coarse angular sensor comprises a position sensitive detector that receives a reflection of an optical beam from a reflective surface on the minor.

4. The minor control system of claim 2, further comprising:
   an optical source that generates an optical beam characterized by a wavelength that is adjustable;
   a partially reflecting surface positioned in an optical path from the optical source to receive the optical beam from the optical source, the partially reflecting surface splitting incident optical waves into a transmitted wave and a reflected wave;

a retroreflector on the mirror, the retroreflector positioned to receive waves from the partially reflecting surface and reflect waves back to the partially reflecting surface, the partially reflecting surface and the retroreflector separated by an optical path length and cooperating to create at least two waves that propagate back along the optical path, the at least two waves interfering to create the interference wave, wherein the interference is a function of the optical path length;

an optical detector positioned to detect an intensity of the interference wave; and a processing device coupled to the optical detector, that (a) based on the detected intensities and corresponding wavelengths, determines a null wavelength at which the intensity of the interference wave is a minimum, and (b) based on the null wavelength, determines an angle of the minor that is a function of the optical path length.

5. The minor control system of claim 4, wherein the processing device interpolates the null wavelength based on a set of lowest detected intensities.

6. The minor control system of claim 4, wherein a wavelength controller scans the wavelength over a range of wavelengths.

7. The minor control system of claim 6, wherein the wavelength controller scans the wavelength over the range of wavelengths in a repeated pattern.

8. The minor control system of claim 6, wherein the wavelength controller repeats a wavelength scan pattern over the range of wavelengths at a frequency of at least 100 kHz.

9. The minor control system of claim 6, wherein the range of wavelengths is approximately 0.1 nm.

10. The minor control system of claim 4, wherein the optical source is a tunable laser diode.

11. The minor control system of claim 10, wherein the tunable laser diode operates in the 1.5 μm region.

12. The minor control system of claim 4, further comprising:

a wavelength measurement device that measures the wavelength of the optical beam, the processing device receiving the measured wavelengths from the wavelength measurement device.

13. The minor control system of claim 4, wherein the retroreflector comprises a corner cube retroreflector.

14. The minor control system of claim 1, wherein the mirror angle sensor subsystem comprises at least two fine sensors to determine the angle of the minor, wherein measurements of the angle of the minor from the at least two fine sensors are compared to remove an effect of pistoning of the minor from measurements of the angle of the mirror.

15. The minor control system of claim 1, wherein the mirror driver comprises a voice coil mechanism for adjusting the angle of the minor.

16. The minor control system of claim 1, wherein the minor driver accelerates the mirror with a first large current for a first short period, then decelerates the mirror with a second large current for a second short period, and then applies a third large current for a third short period to eliminate residual current.

17. The minor control system of claim 16, wherein to adjust an angle of a one-inch minor in 1 ms, the amplitudes of the first, second, and third large currents are approximately 10 A each, the duration of the first and second short periods are approximately 0.4 ms each, and the duration of the third short period is approximately 0.1 ms.

* * * * *

UNITED STATES PATENT AND TRADEMARK OFFICE
CERTIFICATE OF CORRECTION

| | | |
|---|---|---|
| PATENT NO. | : 8,174,705 B1 | Page 1 of 1 |
| APPLICATION NO. | : 12/707650 | |
| DATED | : May 8, 2012 | |
| INVENTOR(S) | : James F. Coward et al. | |

It is certified that error appears in the above-identified patent and that said Letters Patent is hereby corrected as shown below:

Col. 10, line 41 - Col. 12, line 28, throughout the claims there are 29 erroneous instances of the word "minor". In each instance where the word "minor" appears in the claims, replace with the word "mirror".

Signed and Sealed this
Thirty-first Day of July, 2012

David J. Kappos
*Director of the United States Patent and Trademark Office*